United States Patent [19]

Beecken

[11] 3,996,000

[45] Dec. 7, 1976

[54] PROCESS FOR DYEING SYNTHETIC FIBERS

[75] Inventor: Hermann Beecken, Schildgen, Germany

[73] Assignee: Bayer Aktiengesellschaft, Leverkusen, Germany

[22] Filed: Feb. 25, 1975

[21] Appl. No.: 552,806

[30] Foreign Application Priority Data

Feb. 27, 1974 Germany .......................... 2409464

[52] U.S. Cl. .................................... 8/179; 8/162 R; 8/178 R; 260/465 D

[51] Int. Cl.² .................... D06P 3/52; C07C 121/50

[58] Field of Search ........................... 8/178 R, 179; 260/465 D

[56] References Cited

UNITED STATES PATENTS

| | | | |
|---|---|---|---|
| 2,936,319 | 5/1960 | Merian | 260/465 |
| 3,349,098 | 10/1967 | Straley | 260/326 |
| 3,635,957 | 1/1972 | Genta | 260/240 R |
| 3,756,778 | 9/1973 | Genta | 8/179 |
| 3,891,691 | 6/1975 | Genta | 260/465 D |

FOREIGN PATENTS OR APPLICATIONS

| | | |
|---|---|---|
| 2,047,677 | 3/1971 | France |

*Primary Examiner*—Joseph L. Schofer
*Assistant Examiner*—A. L. Clingman
*Attorney, Agent, or Firm*—Plumley and Tyner

[57] ABSTRACT

The invention relates to dyestuffs of the formula

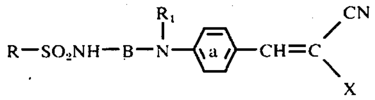

are employed, wherein

R denotes an alkyl, aralkyl or aryl radical, $R_1$ denotes hydrogen, an alkyl radical or a radical of the formula R—$SO_2$NH—B—, B denotes an alkylene chain optionally interrupted by hetero-atoms, and X denotes a nitrile group or the radical $CO_2R_2$, wherein $R_2$ represents alkyl or aralkyl.

The dyestuffs are preferrably suitable for dyeing synthetic fiber materials from organic water-immiscible solvents, according to the exhaustion process.

4 Claims, No Drawings

PROCESS FOR DYEING SYNTHETIC FIBERS

The subject of the present invention is an exhaustion process for dyeing synthetic and semi-synthetic fibre materials from organic, water-immiscible solvents, which is characterised in that dyestuffs which are practically insoluble in tetrachloroethylene at room temperature, of the general formula

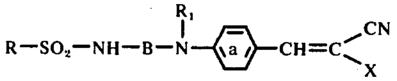

(I)

are employed, wherein

R denotes an alkyl, aralkyl or aryl radical, $R_1$ denotes hydrogen, an alkyl radical or a radical of the formula R—$SO_2$—NH—B—, B denotes an alkylene chain optionally interrupted by hetero-atoms, and X denotes a nitrile group or the radical $CO_2R_2$, wherein $R_2$ represents alkyl or aralkyl and wherein the abovementioned alkyl, aralkyl and aryl radicals and the ring marked *a* can be substituted by non-ionic substituents customary in dyestuff chemistry, by which there are above all to be understood those substituents which are mentioned for the following dyestuffs which are particularly preferred for use.

These are above all those dyestuffs of the formula I, wherein

R represents a lower alkyl radical or the grouping

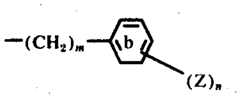

wherein $m$ = 0, 1 or 2, $n$ = 0, 1 or 2,

Z = —OH, —$OC_2H_4CN$, —$OC_2H_4CONH_2$, —$OC_2H_4OH$, —$CH_2OH$,

—COOH, —$CON(R_3)(R_4)$, —NHCHO, —$SO_2N(R_3)(R_4)$, —$CH_2CON(R_3)(R_4)$,

—$CH_2SO_2N(R_3)(R_4)$, —$N(R_3)(COR_5)$, —$N(R_3)(R_4)$, —$N(R_3)(SO_2R_5)$,

—$CH_2$—$N(R_3)(COR_5)$ and —$CH_2$—$N(R_3)(SO_2R_5)$, wherein $R_3$ represents hydrogen, $C_1$- to $C_3$-alkyl, $C_2$- or $C_3$-hydroxyalkyl, $C_2$- or $C_3$-chloroalkyl, $C_2$- or $C_3$-cyanoalkyl and $C_2$- or $C_3$-carbamoylalkyl and $R_4$ independently of $R_3$ also represents hydrogen, $C_1$- to $C_3$-alkyl, $C_2$- or $C_3$-hydroxyalkyl, $C_2$- or $C_3$-chloroalkyl, $C_2$- or $C_3$-cyanoalkyl, $C_2$- or $C_3$-carbamoylalkyl and furthermore a phenyl, pyridyl, imidazolyl or triazolyl nucleus or $R_3$ and $R_4$ conjointly represent the remaining members of a 5-membered or 6-membered heterocyclic structure, for example of the imidazole, pyrrolidine, piperidine, morpholine, thiomorpholine or piperazine series and $R_5$ denotes $C_1$- to $C_3$-alkyl, phenyl, tolyl or chlorophenyl or conjointly with $R_3$ forms a group of the formula $(CH_2)_q$, wherein $q$ represents 3 to 5 and wherein, in the case that $n$ = 2, the radicals Z are identical or different or, if the are in the ortho-positon to one another, conjointly form a grouping of the formula —CO—$NR_3$—$NR_3$—CO—, —$NR_3$—CO—CO—$NR_3$—, —CO—$NR_3$—CO—, —$NR_3$—CO—$NR_3$—, —$NR_3$—$SO_2$—$NR_3$—, —$NR_3$—CS—$NR_3$— or —CO—$NR_3$—$SO_2$—, B represents a $C_1$- to $C_4$-alkylene bridge which is optionally interrupted by hetero-atoms, such as oxygen or sulphur, $R_1$ represents hydrogen, a lower alkyl radical or the grouping —B—NH—$SO_2$R, X represents CN or the $COOR_2$ group, wherein $R_2$ denotes a $C_1$- to $C_3$-alkyl or $C_7$- to $C_9$-phenalkyl radical which is optionally substituted by OH, $OCOCH_3$, $OCH_3$ or CN, the ring a represents a 1,4-phenylene ring which is optionally substituted by 1 or 2 methyl, ethyl, methoxy, trifluoromethyl or acetamino groups or chlorine or bromine atoms and the ring b can also be benz-fused and/or can contain additional non-polar substituents, such as, for example, methyl, ethyl, chlorine, trifluoromethyl, nitrile and methoxy.

The term "lower alkyl radical" preferably represents straight-chain or branched $C_1$- to $C_4$-alkyl groups, which can be substituted by Cl, CN, OH, COOH, $CONH_2$, $CONHCH_3$ or $CONHC_2H_5$.

Preferably, Z represents formylamino, acetamino, methylsulphonylamino, carbamoyl, $CH_3HNCO$- and $(CH_3)_2NCO$-.

Suitable radicals B are:

—$CH_2$—$CH_2$-,

Suitable radical B are: —$CH_2$—$CH_2$—, —$CH(CH_3)$—$CH_2$—,

—$CH(OCH_3)$—$CH_2$—, —$CH(OC_2H_5)$—$CH_2$—, —$CH(OCH_2$—$CH$=$CH_2)$—$CH_2$— , —$(CH_2)_3$—,

-continued $-(CH_2)_4-$, $-CH(C_2H_5)-CH_2-$, $-C_2H_4-O-C_2H_4-$ or $-C_2H_4-S-C_2H_4-$.

The dyestuffs I, which have a maximum solubility in tetrachloroethylene of about 1 g/l at room temperature, are suitable for dyeing fibre materials of linear aromatic polyesters, such as polyethylene terephthalate, and cellulose esters such as cellulose triacetate, polyamides such as polyamide-6 and polyamide-6,6, polyurethanes and many others.

Suitable organic solvents are, above all, aliphatic and aromatic halogenohydrocarbons with boiling ranges from 60° to 180° C, preferably 80° and 130° C.

Tetrachloroethylene, trichloroethylene and 1,1,1-trichloroethane have proved particularly suitable. Mixtures of these solvents can also be used.

The dyeing liquors can contain small amounts, that is to say up to 1 per cent by weight, preferably 0.5 per cent by weight, of water, relative to the weight of the organic solvents.

Preferably, however, no water is added.

The fibre materials can be in the most diverse stages of processing, for example in the form of filaments, flock, tops, yarn, piece goods, such as woven fabrics or knitted fabrics, or made-up goods.

A preferred group of dyestuffs to be used according to the invention correspond to the formula

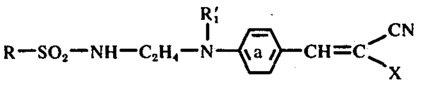

(II)

wherein

R, X and the ring a have the meanings mentioned under the formula I and $R_1'$ denotes methyl, ethyl, cyanoethyl, carbamoylethyl, hydroxyethyl and chloroethyl.

Particularly preferred dyestuffs are those of the formula

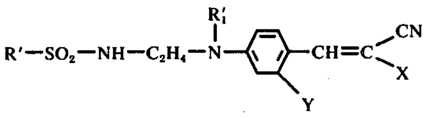

(III)

wherein $R_1'$ and X have the abovementioned meanings and R' denotes methyl, ethyl, benzyl,

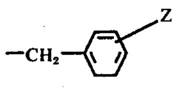

phenyl or

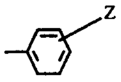

and

Z has the meaning indicated under the formula I and Y represents hydrogen or methyl.

The dyestuffs I are prepared in a manner which is in itself known (compare, for example, German Patent No. 1,285,647), by condensing aldehydes of the formula

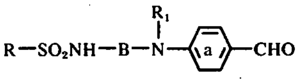

(IV)

or their functional derivatives, of the formula

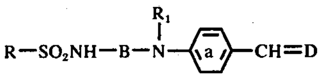

(V)

wherein

R, B, $R_1$ and the ring a have the meanings indicated under the formula I and

D represents N-$R_6$ (aldimines) or

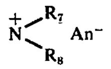

(imonium salts), wherein $R_6$ preferably denotes hydrogen or a phenyl, sulphophenyl or carboxyphenyl radical, $R_7$ and $R_8$ both denote $C_1$- to $C_4$-alkyl or conjointly denote the missing members of a 5-membered or 6-membered ring, such as, for example, pyrrolidine, piperidine or morpholine, $R_8$ also denotes phenyl and $An^-$ represents an acid anion with methylene-active compounds of the formula

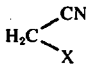

(VI)

wherein

X has the meanings indicated under the formula I.

The reactions are carried out at temperatures between 20° and 160° C, preferably in the temperature range from 50° to 120° C, in the melt or, in most cases, in a solvent which is inert under the reaction conditions. As examples of suitable solvents there may be mentioned lower aliphatic alcohols with 1 to 4 carbon atoms, especially methanol, ethanol, the propanols and butanols, and also benzene, toluene, xylene, chlorobenzene, dichlorobenzenes, chloroform, dimethylformamide, dimethylsulphoxide and acetonitrile. To accelerate the reaction, it is possible to add the basic catalysts customary for the Knoevenagel reaction, such as, for example, ammonia, diethylamine, triethylamine, piperidine, morpholine, N-ethylpiperidine and N-methylmorpholine, basic ion exchange resins, alkali metal hydroxides, alkali metal alcoholates, alkali metal carbonates, alkali metal acetates and the acetates of ammonia and of organic bases, such as, for example, ammonium acetate or piperidine acetate. However, the reaction can also be carried out readily in the presence of acetic acid and even in glacial acetic acid as the solvent.

It is possible to dispense, with advantage, with the customary isolation of the aldehydes IV, which in most cases entails substantial losses, and to use these aldehydes, after decomposition of excess Vilsmeier reagent by means of lower aliphatic alcohols, and adjusting the pH value to about 6.5–8.5, directly for condensations with the methylene-active components VI. The presence of an emulsifying additive, for example of oxethylation products of higher alcohols or substituted phenols, can be useful, especially if aqueous alkali or aqueous ammonia is used to adjust the pH.

Examples of suitable methylene-active compounds VI are malonic acid dinitrile, cyanoacetic acid methyl ester, cyanoacetic acid ethyl ester, cyanoacetic acid 2-hydroxyethyl ester, cyanoacetic acid 2-cyanoethyl ester, cyanoacetic acid 3-acetoxypropyl ester, cyanoacetic acid benzyl ester, cyanoacetic acid 2-hydroxyphenethyl ester and cyanoacetic acid 3-phenylpropyl ester.

To prepare the aldehydes IV or their functional derivatives aromatic bases of the formula

VII

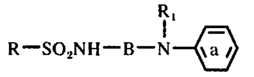

wherein the symbols R, B, $R_1$ and a correspond to the definition given under the formula I are used as starting materials and subjected to the known formylation processes of Vilsmeier or of Duff (Journal of the Chemical Society, London, 1952, pages 1,159–1,164), advantageously in the variant of German Pat. No. 1,206,879, or to a process for the preparation of aldimines, such as is described, for example, in U.S. Pat. No. 2,583,551 (Example 17).

In some cases, for example if the radicals R and/or $R_1$ carry substituents which react with Vilsmeier reagents, the aldehydes IV are preferably prepared by the Duff method or by a method wherein the sulphamide of the formula VIII, either in the form of its alkali metal salt or in the presence of suitable alkali compounds $Me_2CO_3$, MeOH or $MeOCOCH_3$ (with Me = Li, Na, or K) is reacted with an aldehyde of the formula IX (Hal -32 Cl or Br) in accordance with the equation

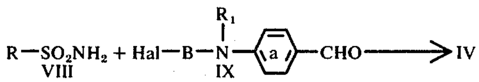

in a solvent, such as, for example, ethanol, butanol, toluene, xylene, chlorobenzene, dichlorobenzene, dimethylformamide, dimethylsulphoxide or hexamethylphosphoric acid triamide at 70°–180° C.

The bases VII are prepared analogously according to equation (1)

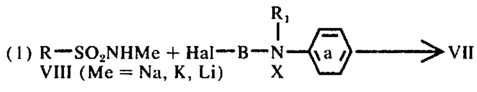

Suitable procedures are shown, for example, in German Auslegeschrift (German Published Specification) No. 1,285,647.

A second method of preparation of the bases VII, capable of many variations, is shown in equation (2)

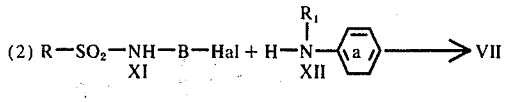

wherein excess arylamines XII can advantageously also serve as solvents and hydrogen halide acceptors for the reactions, which are carried out at elevated temperatures, preferably at between 120° and 160° C. The N-(ω-halogenoalkyl)-sulphamides XI are prepared in a manner which is in itself known, for example, in accordance with the instructions of Example 19 of German Offenlegungsschrift (German Published Specification) No. 2,300,447 or analogously to the procedure indicated in Journal of the American Chemical Socity, vol. 73 (1951), pg. 3,123 (footnote 77).

A third method, which gives very good yields, for the preparation of the bases VII is shown by equation (3)

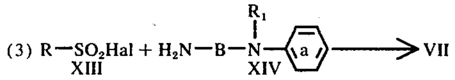

this reaction being carried out in the presence of pyridine, triethylamine, alcoholic and/or aqueous alkali metal hydroxide, alkali metal carbonate or some other customary hydrogen halide acceptor and at temperatures between 0° C and room temperature.

To prepare the sulphochlorides XIII, it is advantageous to use, in the cases of the sulphamoylbenzenesulphochlorides and the carbamoylbenzenesulphochlorides, and also in some other cases, the Sandmeyer reaction, starting from the corresponding sulphanilic acid or anthranilic acid amide derivatives or from other suitably substituted anilines, as is known, for example, from German Offenlegungsschriften (German Published Specifications) Nos. 2.047,384 and 2,300,447. Other sulphochlorides XIII of this type are obtained in a known manner from the corresponding sulphonic acids or alkali metal sulphonates, or by introduction of the chlorosulphonyl group by means of chlorosulphonic acid (compare, for example, N-acetyl-sulphanilic acid chloride, as described in Organic Syntheses, Collective Volume I, page 8).

A great variety of the amines XIV to be used according to equation (3) is accessible in accordance with known methods, for example by reaction of the N-halogenoalkyl-anilines X with excess ammonia under pressure and at elevated temperature, by reaction of the secondary bases XII with halogenoalkylamines $H_2N$-B-Hal (compare, for example, U.S. Pat. No. 3,537,850, Example 1) or also, in very good yields, by catalytic hydrogenation of corresponding N-cyanoalkyl-anilines (compare, for example, Journal of the American Chemical Society, Vol. 73 (1951), pg. 3,124).

Suitable materials for the preparation of the dyestuffs of the formula I are, for example, the following aldehydes IV (or their functional derivatives V),

IV

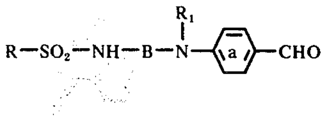

wherein

R denotes the radicals $CH_3$, $CH_2Cl$, $C_2H_5$, $C_3H_7$, $C_4H_9$, $C_6H_5$,
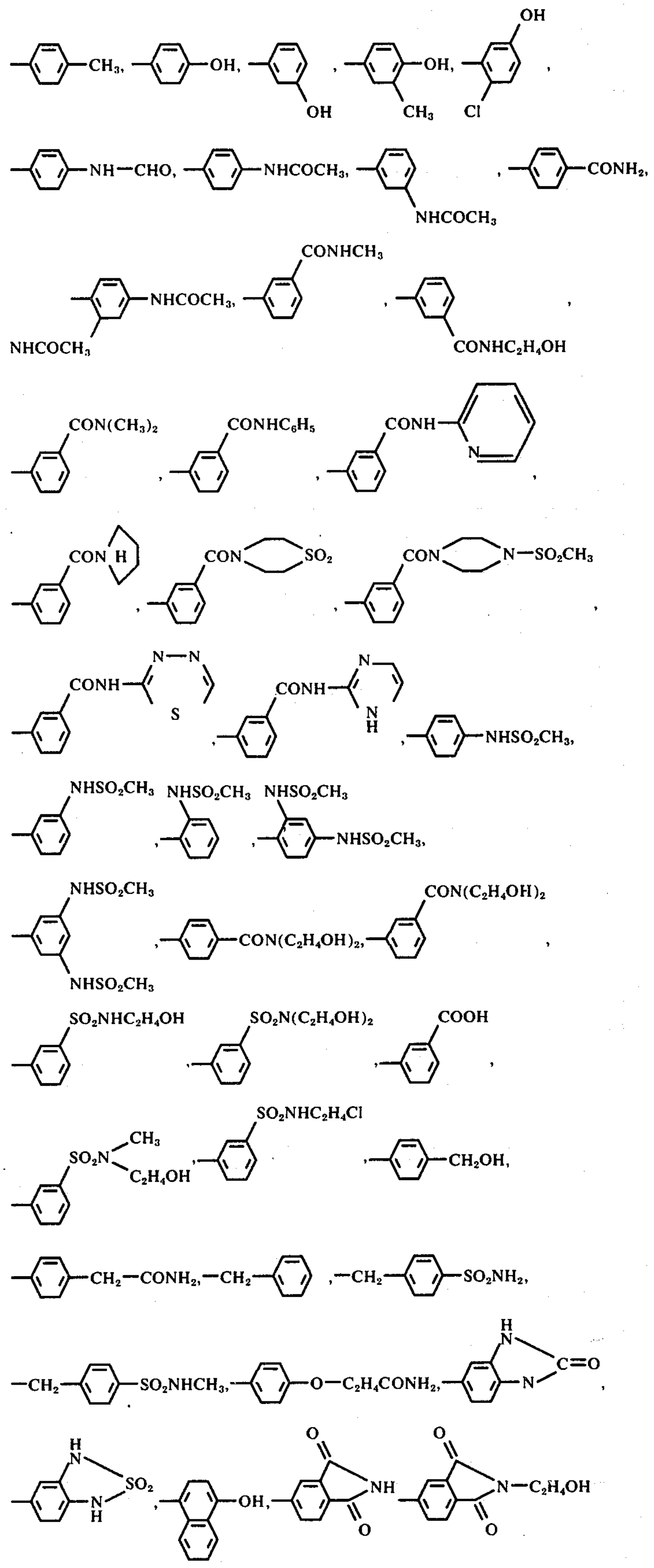

-continued

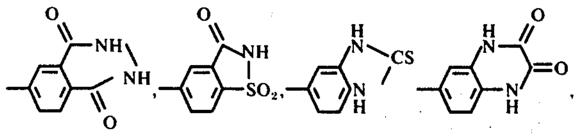

B denotes the bridge members $-CH_2-CH_2-$, $$-\underset{CH_3}{\underset{|}{CH}}-CH_2-,\ -\underset{OCH_3}{\underset{|}{CH_2}}-,\ -\underset{OC_2H_5}{\underset{|}{CH}}-CH_2-,\ -\underset{OCH_2-CH=CH_2}{\underset{|}{CH}}-CH_2-,$$

$$-(CH_2)_3-,\ -(CH_2)_4-,$$

$$-\underset{C_2H_5}{\underset{|}{CH}}-CH_2-,$$

$-C_2H_4-O-C_2H_4-$ or $-C_2H_4-S-C_2H_4-$ and $R_1$ denotes hydrogen or the radicals $CH_3$, $C_2H_5$, $C_2H_4OH$, $C_2H_4Cl$, $C_2H_4CN$, $C_2H_4CONH_2$, $C_3H_7$, $-CH_2-CH(CH_3)-CN$ or $-CH_2-CH_2-CH(CH_3)-CONH_2$, whilst the ring a can be Equally, it can be advantageous to add non-ionic auxiliaries to the liquors; these are added in amounts of 0.05–2 percent by weight, based on the weight of the organic solvents.

Examples of possible non-ionic auxiliaries are the known surface-active oxethylation and propoxylation products of fatty alcohols, alkylphenols, fatty acids and fatty acid amides.

The auxiliaries mentioned can also be used for converting the dyestuffs according to the invention into pastes, and these dyestuff-auxiliary pastes can then be introduced into the dyeing liquors.

Because of the partially somewhat inadequate solubility of the dyestuffs to be used according to the invention in the solvents in question, it can be of advantage to subject the dyestuffs beforehand to a forming process, for example by grinding the dyestuffs finely in

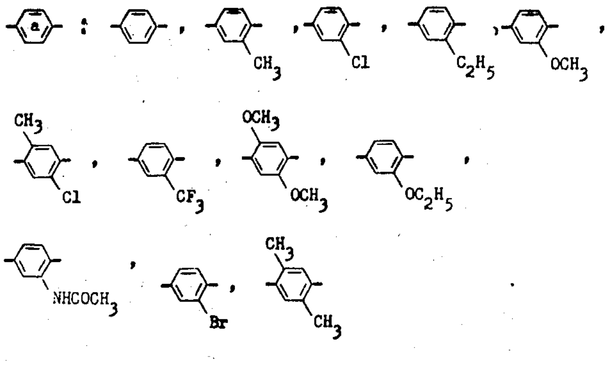

The recital of the suitable structural elements, R, B, $R_1$ and ring a can only be in the nature of examples and still leaves unmentioned numerous suitable aldehyde variants within the scope of the formula I according to the invention.

The dyeing process according to the invention, using dyestuffs of the formula I, is preferably carried out in closed apparatuses. For this purpose, for example, the fibre materials are introduced into the dyebath at room temperature, and the bath is heated to 60°–170° C, but preferably to 100°–155° C and is kept at this temperature until the material has reached the desired depth of colour; in most cases this is reached within 10–60 minutes. Thereafter, the liquor is cooled and separated from the dyed goods, the latter are rinsed with fresh solvent and the adhering organic solvent is removed by centrifuging or suction and subsequent drying of the fibre material in a warm stream of air.

Dyeing in anhydrous dyebaths is particularly preferred. However, in some cases it can be of advantage to add to the dyeing liquors small amounts, for example up to 1 percent by weight, and preferably approx. 0.5 percent by weight, of water, based on the amount of the organic solvent.

mixtures of novolac-polyethylene glycol ether monocarboxylic acid esters and phthalic acid esters and employing them in this form for the preparation of the dyeing liquor.

Such forming treatments are carried out in accordance with instructions in Belgian Patent No. 788,240.

The dyestuffs are distinguished by good affinity from organic solvents, resulting in high tinctorial yields. The dyeings obtained display good general fastness properties, especially good fastness to sublimation, light, washing and wet processing.

It should be noted that the use of mixtures of the dyestuffs of the formula I occasionally results in an increase in the tinctorial yield in comparison to that with the individual dyestuffs.

The dyeing process according to the invention is explained in more detail by the examples which follow. The amounts quoted in parts are parts by weight, unless expressly stated to the contrary.

The dyestuffs to be used according to the invention have, to a very predominant degree, not previously been described in the literature.

Hence, a further subject of the present invention is the new styryl dyestuffs of the formula I, wherein the substituents have the meaning indicated earlier, with the proviso that X represents $CO_2R_2$ if R denotes an alkyl-substituted aryl radical, and a process for their preparation.

Preferred new dyestuffs of the formula I are those wherein

R represents alkyl or aralkyl and the remaining substituents have the meaning mentioned.

Particularly preferred dyestuffs of the formula I are those wherein

R represents methyl, ethyl, the

R represents methyl, ethyl, the

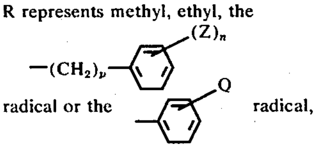

wherein

*p* denotes 1 or 2,

Q denotes hydrogen, acetylamino, carbamoyl, OH, methylsulphonylamino, COOH or sulphamoyl, and the remaining radicals have the abovementioned meaning, with the proviso that $R_1$ represents carbamoylethyl or hydroxyethyl if Q denotes hydrogen.

EXAMPLE 1

100 parts of a fabric of texturised polyethylene terephthalate fibres are introduced, without prior cleaning, into a dyebath at room temperature, which has been prepared from 1 part of the dyestuff of the formula

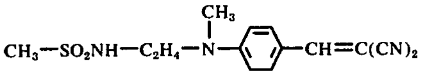

and 1,000 parts of perchloroethylene. The bath is warmed to 120° C over the course of 10 minutes, with good circulation of the liquor, and is kept at this temperature for 30 minutes. The dyeing liquor is then separated off and the dyed goods are rinsed for 5 minutes at approx. 40° C with fresh solvent.

After removing the rinsing liquor, the dyed goods are centrifuged and dried in a stream of air. They display a strong, greenish-tinged yellow dyeing which has good fastness to light and to sublimation and in particular very good fastness to washing.

If a fabric of polydimethylenecyclohexane terephthalate is dyed in the same manner, an equivalent brilliant yellow dyeing is obtained.

EXAMPLE 2

To prepare the dyestuff used in Example 1, the following procedure is employed.

13.8 parts of methanesulphochloride are added dropwise over the course of approx. 40 minutes to 15 parts of N-methyl-N-β-aminoethyl-aniline, prepared from N-methylaniline and β-chloroethylamine hydrochloride analogously to Example 1 of U.S. Pat. No. 3,537,850, dissolved in 30 parts by volume of pyridine, at 5°–10° C.

After stirring for a further 3 hours at 5°–10° C, the reaction has taken place quantitatively. The reaction mixture is poured onto ice, the new base which has separated out as an oil is taken up in toluene, the toluene solution is washed with water until free from pyridine, and dried over sodium sulphate, and the toluene is removed by distillation in a water pump vacuum.

Yield: 21.8 parts of N-methyl-N-(β-methanesulphamidoethyl)-aniline, as a brownish oil.

19 parts of the base are dissolved in 22 parts of dimethylformamide, 18.4 parts of phosphorus oxychloride are added dropwise, with occasional cooling, in such a way that the temperature does not exceed 50° C, and the Vilsmeier formylation is completed by stirring for a further 15 hours at 50° C.

As the next step, 80 parts by volume of methanol are allowed to run dropwise into the mixture, with external cooling, under conditions such that the internal temperature as far as possible does not exceed 50°–60° C, and the mixture is adjusted to a pH value of 6.5–8 by dropwise addition of approx. 35 parts by volume of concentrated ammonia. Hereupon, the aldehyde formed separates out in part as an oil. Without isolating this oil, 6.9 parts of malodinitrile are added to the reaction mixture, and complete conversion to the styryl dyestuff is achieved by stirring for 3 hours at 60°–70° C.

On cooling the batch, the dyestuff of the formula indicated in Example 1 crystallises out and is isolated by filtration, washing with a methanol/water mixture and subsequent washing with water.

The yield, after drying in vacuo at 50° C, is 19–20 parts of dyestuff in the form of an orange crystal powder.

The dyestuffs listed in the table which follows can also be prepared analogously. The colour shade of the dyestuff in question on polyethylene terephthalate, dyed in accordance with the instructions of Example 1, is also shown.

| Example No. | Structure | Colour shade |
|---|---|---|
| 3 | 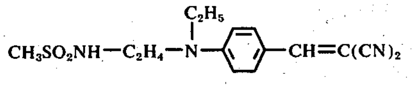 | greenish-tinged yellow |
| 4 | 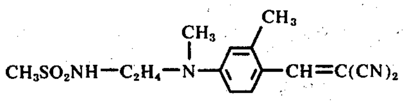 | " |
| 5 | 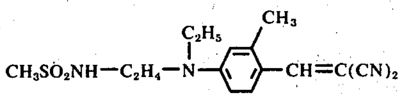 | " |

-continued
| | | |
|---|---|---|
| 6 | 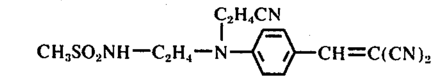 | " |
| 7 | 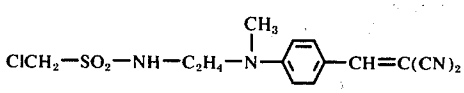 | " |
| 8 | 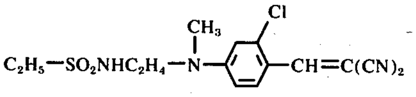 | " |
| 9 | 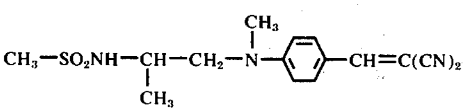 | " |
| 10 | 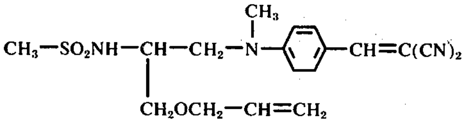 | " |
| 11 | 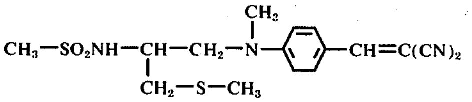 | " |
| 12 | 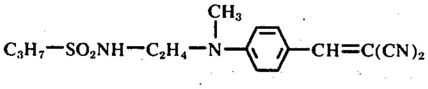 | " |
| 13 | 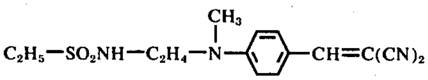 | " |
| 14 | 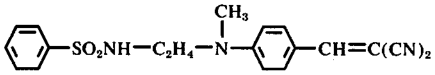 | " |
| 15 | 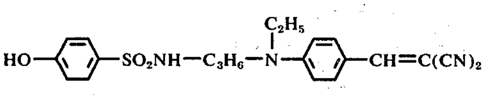 | " |
| 16 | 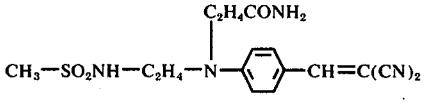 | " |
| 17 | 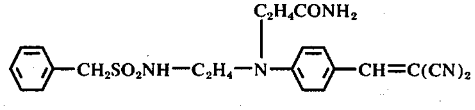 | " |
| 18 | 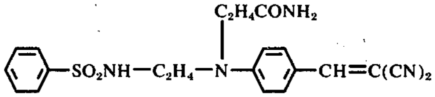 | " |
| 19 | 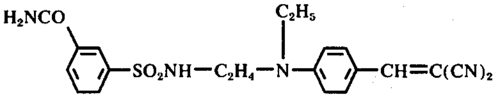 | " |
| 20 | 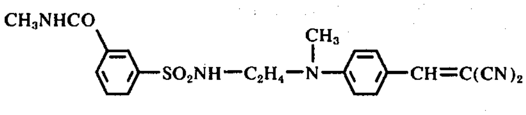 | " |
| 21 | 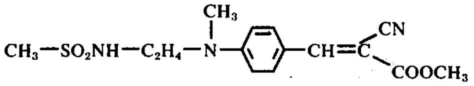 | " |
| 22 | 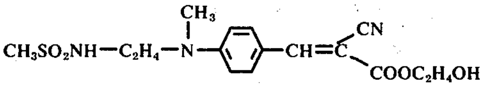 | " |

-continued
| | | |
|---|---|---|
| 23 | 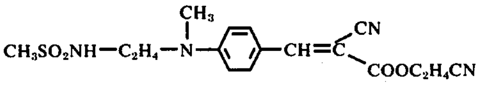 | ″ |
| 24 | 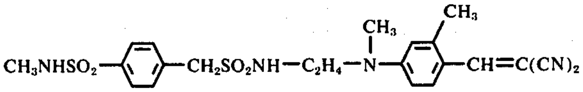 | ″ |
| 25 | 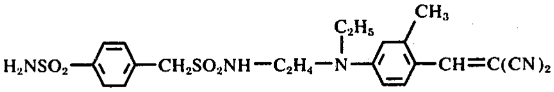 | ″ |
| 26 | 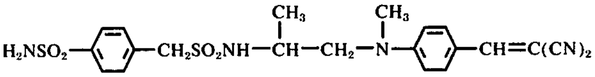 | ″ |
| 27 | 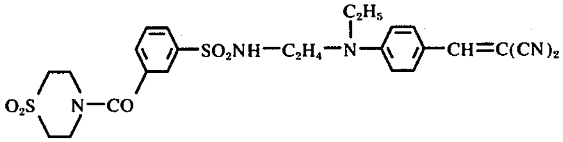 | ″ |
| 28 | 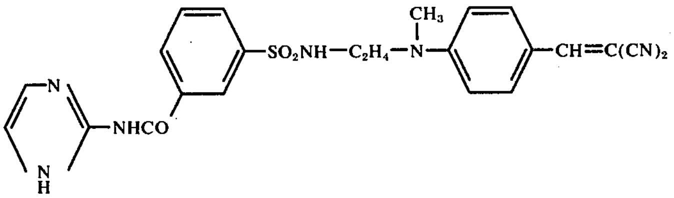 | ″ |
| 29 | 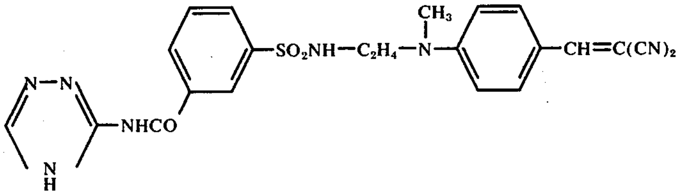 | ″ |
| 30 | 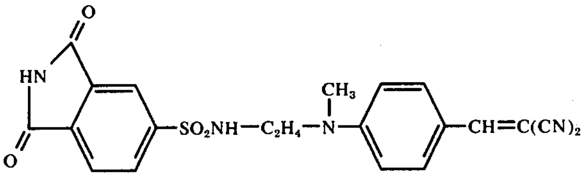 | ″ |
| 31 | 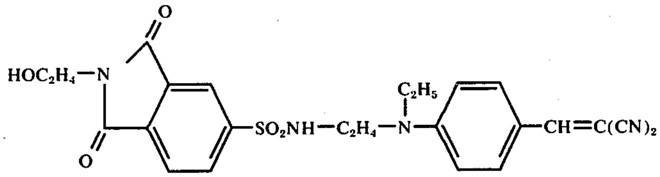 | ″ |
| 32 | 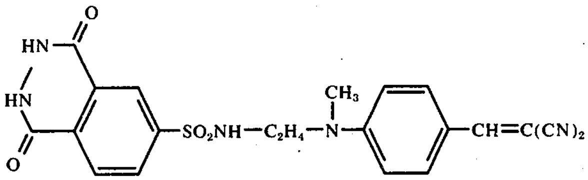 | ″ |

-continued
| | | |
|---|---|---|
| 33 | 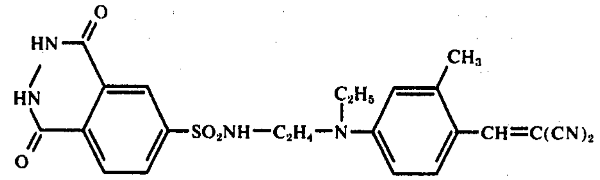 | " |
| 34 | 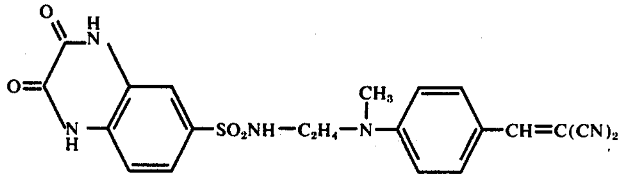 | " |
| 35 | 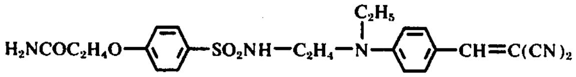 | " |
| 36 | 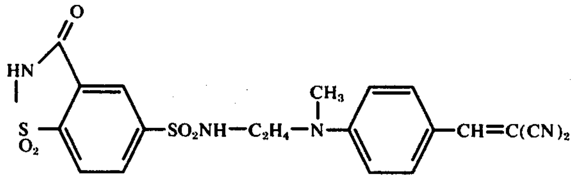 | " |
| 37 | 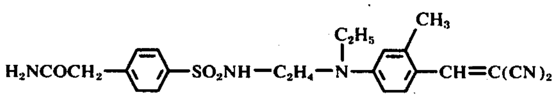 | " |
| 38 | 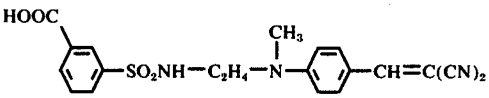 | " |
| 39 | 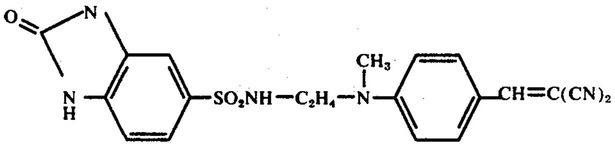 | " |
| 40 | 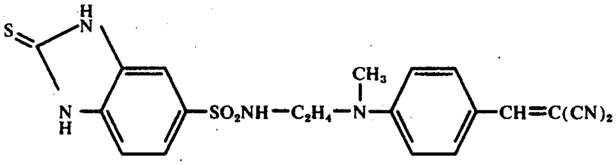 | " |
| 41 | 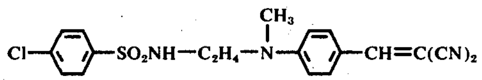 | " |
| 42 | 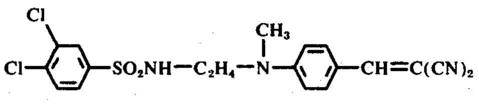 | " |
| 43 | 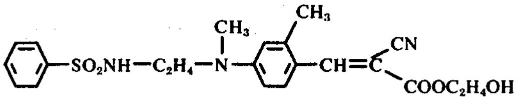 | " |
| 44 | 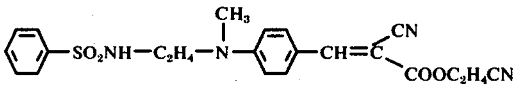 | " |

EXAMPLE 45 a. 24.4 parts of 4-nitrobenzenesulphonic acid chloride are introduced in portions into a solution, cooled to 0°–5° C, of 15 parts of N-methyl-N-β-aminoethyl-aniline in 30 parts by volume of pyridine over the course of about one hour, whilst stirring and cooling. Thereafter the mixture is stirred for a further 3 hours whilst cooling and subsequently for several hours at room temperature. The mixture is then poured into approx. 500 parts of ice water, whereupon a brownish oil precipitates, which slowly crystallises throughout. After stirring for several hours, the ice water is removed and replaced by fresh ice water. This operation must be repeated, if necessary, until the product has crystallised throughout. It is then filtered off, washed with water until substantially free from pyridine, and dried in vacuo at 50° C. The yield is 28-30 parts of N-methyl-N-β-(4-nitrobenzenesulphamido)-ethyl-aniline which after recrystallisation from toluene forms pale yellow prisms of melting point 98°–99° C.

If 3- or 2-nitrobenzenesulphochloride is used in this example, the corresponding isomeric bases are obtained, again in good yields.

Analogously, using 2,4-dinitrobenzenesulphochloride or 3,5-dinitrobenzenesulphochloride results in the corresponding dinitrobenzenesulphamido bases of the formulae

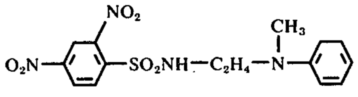

and

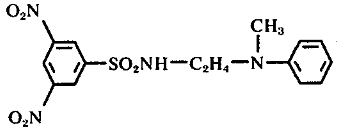

If, instead of N-methyl-N-β-aminoethyl-aniline, other bases, for example N-methyl- or N-ethyl-N-γ-aminopropyl-aniline or the bases N-methyl- or N-ethyl-N-γ-aminopropyl-m-toluidine, which are particularly readily accessible by hydrogenation of the corresponding N-cyanoethyl compounds, are reacted analogously with the mono- and di-nitrobenzenesulphochlorides mentioned, the corresponding homologous nitroor dinitro-benzenesulphamido bases are obtained, for example.

The (di)nitrobenzenesulphamido bases are used as starting compounds for the preparation of the corresponding (di)nitrobenzensulphamido-styryl dyestuffs, the catalytic hydrogenation of which gives the corresponding (di)aminobenzenesulphamido-styryl dyestuffs. The latter are reacted with acylating reagents such as sulphochlorides (for example methanesulphochloride, ethanesulphochloride or benzenesulphochloride), carboxylic acid chlorides or carboxylic acid anhydrides (for example acetyl chloride, propionyl chloride or acetic anhydride), isocyanates (for example methyl isocyanate or ethyl isocyanate), isothiocyanates (for example methyl isothiocyanate or ethyl isothiocyanate) or urea to give dyestuffs according to the invention. The example which follows illustrates this:

b. 33.5 parts of N-methyl-N-β-(4-nitrobenzenesulphamido)-ethyl-aniline in 22 parts of dimethylformamide are formylated by the Vilsmeier method by dropwise addition of 18 parts of phosphorus oxychloride at maximally 60° C, followed by stirring for about 15 hours at 50°–60° C. The further operation is carried out as described in detail in Example 2. 27.7 parts of the styryl dyestuff of the formula

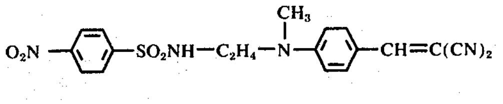

are obtained as an intermediate product. This melts at 149°–151.5° C after recrystallisation from butanol.

For the catalytic hydrogenation, 6.6 parts of the compound in 150 parts by volume of ethanol are treated with hydrogen over 2 parts of Raney nickel moist with ethanol at 40°–50° C and at up to 5 atmospheres pressure. The absorption of hydrogen has ceased after 2–3 hours. The catalyst is removed by filtration and the solvent is removed by distilling off under reduced pressure.

The dry, orange-yellow evaporation residue, which consists of the 4-aminobenzenesulphamido-styryl dyestuff, is mixed with 30 parts by volume of acetic anhydride and a few drops of pyridine, and, after standing overnight, the mixture is poured onto ice.

After decomposition of the excess acetic anhydride, the product which has precipitated is filtered off, carefully washed with water and dried. Approx. 5 parts of dyestuff of the formula

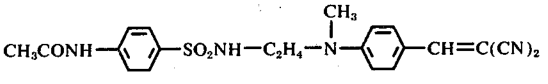

are obtained; this dyestuff dyes polyester materials, from perchloroethylene, in brilliant strong greenish-tinged yellow shades. The dyeings are distinguished by good fastness to sublimation, light and washing and good general fastness properties.

Heating the same hydrogenation product with excess formic acid to the reflux temperature gives the corresponding N-formyl-styryl dyestuff (Example 46), treatment with methyl isocyanate in dimethylformamide gives the corresponding methylurea-styryl dyestuff (Example 47) and analogous reactions and variation of the starting materials give the remaining examples shown in the table which follows.

| Example No. | Structure | Colour shade on polyester (after dyeing according to the instructions of Example 1) |
|---|---|---|
| 46 | 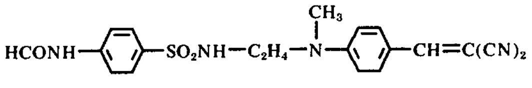 | greenish-tinged yellow |

-continued
| Example No. | Structure | Colour shade on polyester (after dyeing according to the instructions of Example 1) |
|---|---|---|
| 47 | 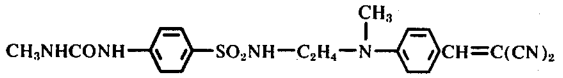 | " |
| 48 | 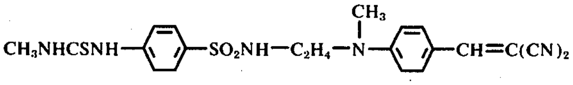 | " |
| 49 | 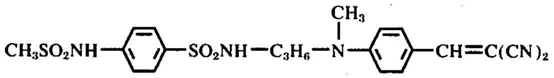 | " |
| 50 | 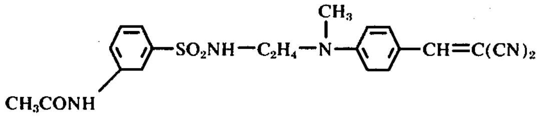 | " |
| 51 | 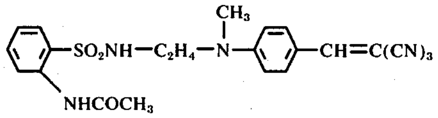 | " |
| 52 | 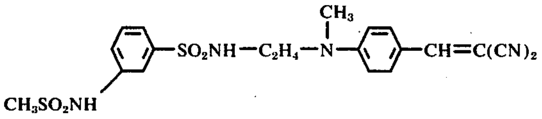 | " |
| 53 | 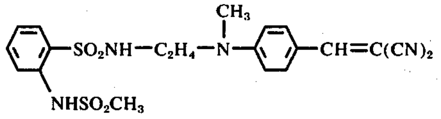 | " |
| 54 | 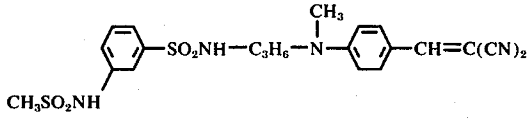 | " |
| 55 | 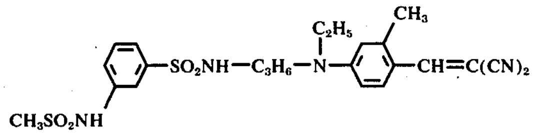 | " |
| 56 | 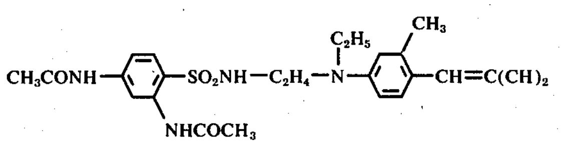 | " |
| 57 | 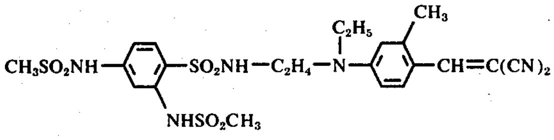 | " |
| 58 | 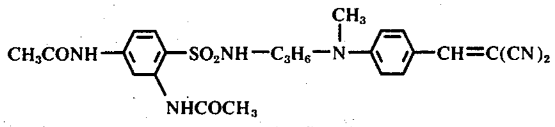 | " |
| 59 | 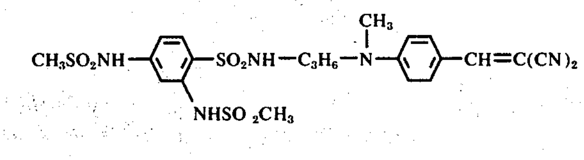 | " |

-continued

| Example No. | Structure | Colour shade on polyester (after dyeing according to the instructions of Example 1) |
|---|---|---|
| 60 | 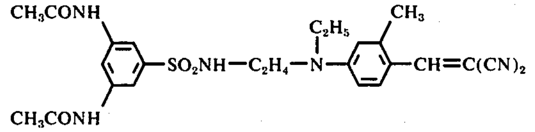 | " |
| 61 | 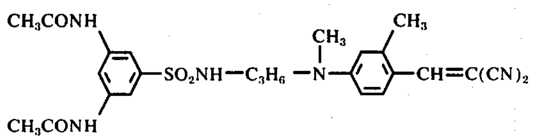 | " |
| 62 | 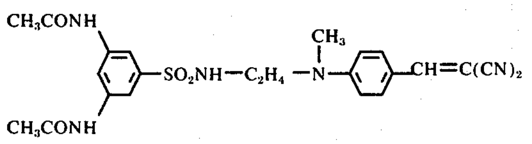 | " |
| 63 | 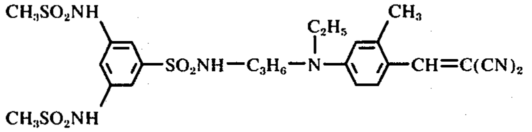 | " |
| 64 | 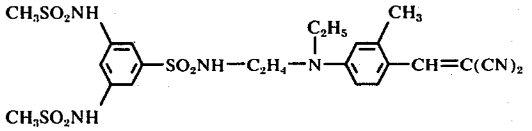 | " |
| 65 | 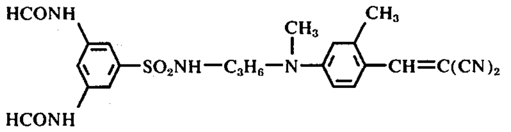 | " |
| 66 | 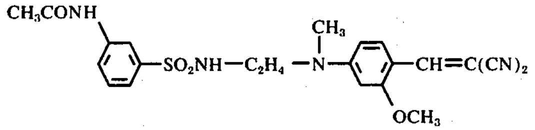 | " |

EXAMPLE 67 a. 38.3 parts of N-methyl-N-β-(4-methanesulphamidobenzenesulphamido)-ethyl-aniline in 50 parts of dimethylformamide are treated with 20 parts of phosphorus oxychloride analogously to the preceding examples and formylated by stirring for 15 hours at 50°–60° C. After the customary working up by decomposing the mixture with 150 parts by volume of ethanol and neutralising by dropwise addition of concentrated aqueous ammonia, 6.9 parts of malodinitrile are added without intermediate isolation of the aldehyde formed, and heating for 2 to 3 hours to the reflux temperature produces complete conversion to the styryl dyestuff of the formula

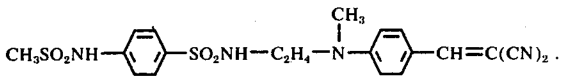

The dyestuff produces a strong greenish-tinged yellow dyeing with good fastness properties on polyester materials, dyed from perchloroethylene.

b. To prepare the aniline based used under (a), 180 parts of N-methyl-N-β-(4-nitrobenzenesulphamido)-ethyl-aniline (compare Example 45a) in 1,800 parts by volume of methanol are hydrogenated over Raney nickel at 40° C and a maximum hydrogen pressure of 5 kg/cm$^2$. After filtering off the catalyst, evaporating the solvent and drying the residue in vacuo, approximately 158 parts of almost colourless crystals of melting point 120°–121° C are obtained. They can be purified further by recrystallisation from approx. 4,000 parts by volume of toluene, with addition of fuller's earth: 142 parts of N-methyl-N-β-(4-aminobenzenesulphamido)-ethyl-aniline of melting point 122°–123.5° C (coarse prisms).

To mesylate the product, the latter is dissolved in pyridine entirely analogously to Example 2 and the corresponding amount of methanesulphochloride is added dropwise at 0°–5° C. The customary working-up gives N-methyl-N-β-(4-methanesulphamidobenzenesulphamido)-ethyl-aniline in the form of an almost colourless powder.

EXAMPLE 68 a. 17.4 parts of N-methyl-N-β-(4-acetamidobenzenesulphamido)-ethyl-aniline in 25 parts of dimethylformamide are formylated analogously to Example 67a, by the Vilsmeier method, by addition of 10 parts of phosphorus oxychloride, and the aldehyde is converted, without isolation, into the styryl dyestuff of the formula

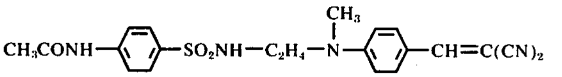

by means of 3.5 parts of malodinitrile, as described. The dyestuff dyes polyester materials from perchloroethylene in strong, greenish-tinged yellow shades with good fastness properties.

The N-methyl-N-β-(4-acetamidobenzenesulphamido)-ethylaniline of melting point 153°–155° C (leaflets from chlorobenzene/fuller's earth) employed above was obtained by the following two methods.

b. 27 parts of the hydrogenation product described under Example 67b) are dissolved in 40 parts by volume of pyridine and 80 parts of acetic anhydride are added whilst cooling to 15°–20° C. After standing for 15 hours, the reaction mixture is poured into ice water and is stirred until the product which is initially obtained in a smeary form has crystallised throughout. After filtration, washing with water and drying at 70° C in vacuo, the crude yield is 29.6 parts of N-methyl-N-β-(4-acetamidobenzenesulphamido)-ethyl-aniline.

c. 29.2 parts of N-acetyl-sulphanilic acid chloride are introduced in portions, over the course of approx. 1 hour, into a mixture of 15 parts of N-methyl-N-β-aminoethyl-aniline and 50 parts by volume of pyridine, cooled to 0°–5° C. The mixture is then stirred for a further 3 hours at 5° C and a further 15 hours at room temperature and is then poured out onto ice. The mixture is stirred and the water is replaced repeatedly by decanting until the reaction product which initially precipitated in a sticky form has crystallised throughout. After filtration, washing with water and drying at 80° C in vacuo, the yield of crude product is 34.4 parts. Recrystallisation from chlorobenzene/fuller's earth gives 23.7 parts of glistening leaftlets (68.3% of theory) of melting point 153°–155° C. The compound is identical with that obtained under (b).

The table which follows contains further styryl dyestuffs according to the invention, which are prepared similarly to the procedures of Examples 67 and 68 by varying the starting compounds and the acylating agents.

| Example No. | Structure | Colour shade on polyester (after dyeing according to the instructions of Example 1) |
|---|---|---|
| 69 | 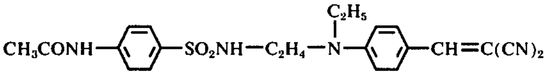 | greenish-tinged yellow |
| 70 | 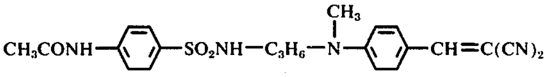 | " |
| 71 | 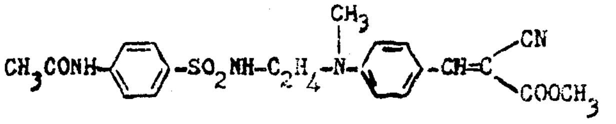 | " |
| 72 | 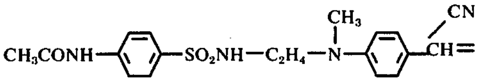 | " |
| 73 | 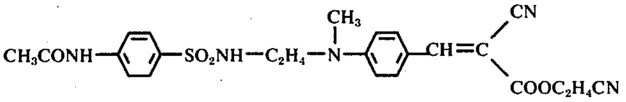 | " |
| 74 | 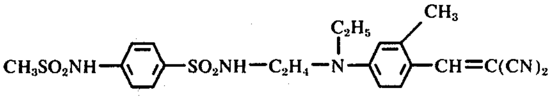 | " |
| 75 | 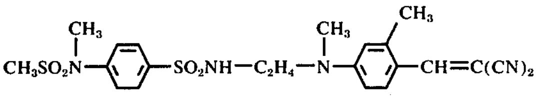 | " |
| 76 | 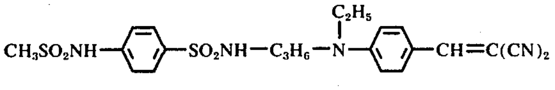 | " |
| 77 | 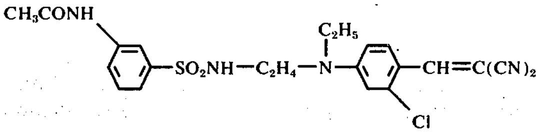 | " |

-continued

| Example No. | Structure | Colour shade on polyester (after dyeing according to the instructions of Example 1) |
|---|---|---|
| 78 | 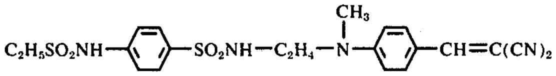 | " |
| 79 | 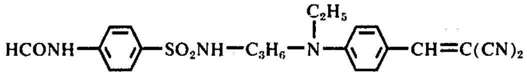 | " |
| 80 | 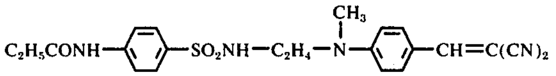 | " |
| 81 | 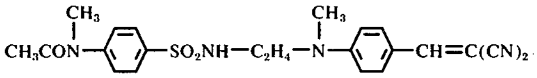 | " |
| 82 | 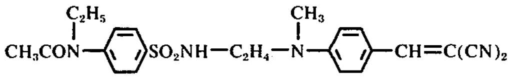 | " |

EXAMPLE 83

70 parts of sodium methanesulphonic acid amide and 121 parts of N-ethyl-N-γ-bromopropyl-aniline in 150 parts by volume of dry n-amyl alcohol are heated to 140°–150° C for approx. 6-9 hours until the aniline base has been converted practically completely (as shown by thin layer chromatography).

The solvent is distilled off — finally in a water pump vacuum — 750 parts of water are added to the residue and the reaction product which has separated out as an oil is isolated in the usual manner by extraction by shaking with chloroform, washing the solution with water, drying it and evaporating the solvent.

109 parts of N-ethyl-N-γ-methanesulphamidopropylaniline are obtained as a brownish oil which is reacted as follows, without additional purification: 64 parts of the oil in 55 parts of dimethylformamide are formylated by the Vilsmeier method by dropwise addition of 46 parts of phosphorus oxychloride at below 50° C and subsequent stirring for 15 hours at 50°–60° C. The mixture is decomposed, whilst cooling, by dropwise addition of 200 parts by volume of methanol at maximally 50° C, the pH is brought to 6.5–8 by dropwise addition of about 90 parts by volume of concentrated aqueous ammonia, 17.5 parts of malodinitrile are added and the whole is heated to the reflux temperature for 3 hours. After cooling, and leaving the reaction mixture to stand for some time, ultimately at 0°–5° C, the dyestuff which has crystallised out is filtered off, washed with 150–200 parts by volume of methanol and finally with a large amount of water until free from salt, and dried in vacuo.

45–50 parts of styryl dyestuff of the formula

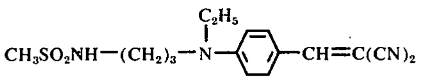

are obtained in the form of red-brown crystals with a bluish sheen, which have a melting point of 147°–149° C and which can be purified by recrystallisation from approx. 1,000 parts by volume of chlorobenzene with addition of fuller's earth and are then obtained as golden yellow needles of melting point 150°–151° C.

The N-ethyl-N-γ-methanesulphamidopropyl-aniline employed above for the formylation reaction is also obtained by the following methods.

a. 41.4 parts of methanesulphonic acid chloride are added dropwise over the course of approx. 1.5 hours to 53.4 parts of N-ethyl-N-γ-aminopropyl-aniline in 90 parts by volume of pyridine at 0°–5° C and the mixture is stirred for a further 3 hours whilst cooling with ice and, after standing for 15 hours at room temperature, is poured into water. Isolation by extraction with chloroform is carried out as above.

The crude yield is approx. 60 parts.

b. 85.8 parts of N-γ-chloropropyl-methanesulphonamide are added in portions, whilst stirring, to 181 parts of N-ethylaniline warmed to 120° C and the temperature is subsequently raised to 145°–150° C over the course of 2 to 3 hours and left thereat for some hours until chromatographically no further reaction is detectable.

The mixture is left to cool to below 100° C, 200 parts of 10% strength sodium hydroxide solution are added and the excess N-ethylaniline is removed by steam distillation. The oily, non-volatile residue from the distillation is worked up by extraction with chloroform, as described above.

114 parts of crude N-ethyl-N-γ-methanesulphamidopropyl-aniline are obtained.

The dyestuff of this example dyes polyester materials and triacetate materials from perchloroethylene is strong, greenish-tinged yellow shades, and the dyeings have good general fastness properties.

The dyestuffs according to the invention listed in the table which follows are also prepared analogously to this example by using cyanoacetic acid derivatives instead of malodinitrile and varying the starting materials.

In these preparations it can, in some cases, become necessary to add further dimethylformamide or acetonitrile in the course of the Vilsmeier formylation reaction, in order to keep the mixture stirrable.

| Example No. | Structure | Colour shade on polyester (after dyeing according to the instructions of Example 1) |
|---|---|---|
| 84 | 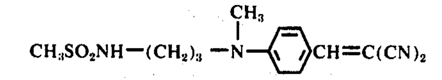 | greenish-tinged yellow |
| 85 | 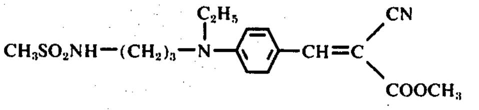 | " |
| 86 | 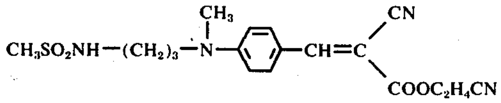 | " |
| 87 | 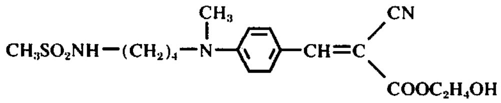 | " |
| 88 | 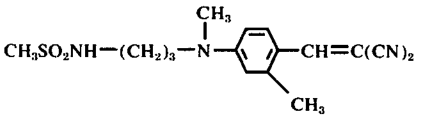 | " |

EXAMPLE 89

100 parts of a triacetate fibre fabric are introduced at room temperature into a dyebath prepared from 1 part of the dyestuff of Example 2 and 1,000 parts of perchloroethylene. The bath is heated to 110° C over the course of 20–30 minutes with good circulation of the liquor and dyeing is carried out at this temperature for 45 minutes. Thereafter, the liquor is separated from the dyed goods and the latter are rinsed with fresh perchloroethylene at 40° C. After the rinsing liquor has also been separated off, the fabric is freed from adhering remnants of solvent by centrifuging and drying in a stream of air. The strong, greenish-tinged yellow dyeing produced on the fabric has good fastness properties.

If a fabric of polyamide fibres is dyed in the same manner, a comparable dyeing is obtained.

EXAMPLE 90

100 parts of cellulose acetate filament yarn are introduced, at room temperature, into a dyebath prepared from 1 part of the dyestuff of Example 83, 1,000 parts of perchloroethylene, 1.5 parts of oleic acid ethanolamide, 1.5 parts of oleyl alcohol eicosaethylene glycol ether and 6 parts of water. The bath is warmed to 78° C over the course of 20–30 minutes with good circulation and dyeing is carried out at this temperature for 45 minutes. The dyeing liquor is then separated off and the dyed goods are rinsed with fresh perchloroethylene and freed from the residual solvent by suction draining and drying in a stream of air. The yarn shows a strong brilliant greenish-tinged yellow dyeing which has good fastness properties.

EXAMPLE 91

100 parts of a polyester fibre fabric are introduced at room temperature into a dyebath prepared from 1 part of the dyestuff of Example 7, 1,000 parts of perchloroethylene, 1.5 parts of oleic acid ethanolamide, 1.5 parts of oleyl alcohol eicosaethylene glycol ether and 6 parts of water; the bath is heated to 120° C over the course of 10–15 minutes with intensive circulation of the liquor and dyeing is carried out at this temperature for 45 minutes. The dyed goods are then separated from the liquor, rinsed with fresh solvent at 40° C and dried in a stream of air after centrifuging off the rinsing liquor.

The goods display a full, greenish-tinged yellow dyeing with good fastness properties.

On replacing the perchloroethylene by the same amount of trichloroethylene, chlorobenzene, benzotrifluoride, chlorotoluene, xylene, perfluoro-n-hexane, dibromoethylene, n-butanol, n-amyl alcohol or ethylene glycol monoethyl ether and in other respects following the procedure indicated in the present example, brilliant yellow dyeings with similar properties are obtained.

I claim:

1. In an exhaustion process for dyeing synthetic fiber materials from organic, water-immiscible solvents, the improvement which comprises employing a dyeing liquor which consists essentially of:

1. a styryl dyestuff which is substantially insoluble in tetrachloroethylene at room temperature and has the formula

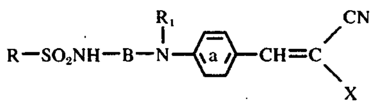

wherein

R is alkyl, aralkyl or aryl;

$R_1$ is hydrogen, alkyl, or R—$SO_2$NH—B—;

B is alkylene which may be interrupted by heteroatoms;

X is cyano or $CO_2R_2$;

$R_2$ is alkyl or aralkyl; and the abovementioned alkyl, cycloalkyl, aralkyl and aryl radicals and ring *a* may be substituted by non-ionic substituents customary in dyestuff chemistry;

2. an organic water-immiscible solvent, and
3. 0–1% water based on the weight of said solvent.

2. Process according to claim 1, characterised in that the styryl dyestuffs used are those of the formula indicated, wherein R represents a lower alkyl radical or the grouping

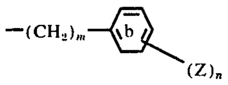

wherein
$m = 0$, 1 or 2,
$n = 0$, 1 or 2,
Z = OH, $CH_2OH$, $OC_2H_4OH$, $OC_2H_4CN$, $OC_2H_4CONH_2$, COOH,

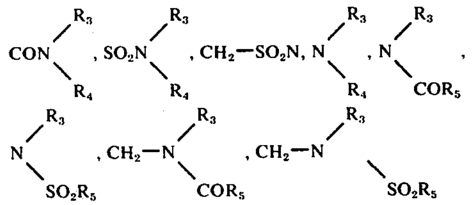

wherein
$R_3$ represents hydrogen, $C_1$- to $C_3$-alkyl, $C_2$- or $C_3$-hydroxyalkyl, $C_2$- or $C_3$-chloroalkyl, $C_2$- or $C_3$-cyanoalkyl and $C_2$- or $C_3$-carbamoylalkyl and
$R_4$ independently of $R_3$ also represents hydrogen, $C_2$- or $C_3$-chloroalkyl, $C_2$- or $C_3$-hydroxyalkyl, $C_1$- to $C_3$-alkyl, $C_2$- or $C_3$-cyanoalkyl, $C_2$- or $C_3$-carbamoylalkyl and furthermore a phenyl, pyridyl, imidazolyl or triazolyl nucleus or
$R_3$ and $R_4$ conjointly represent the remaining members of a 5-membered or 6-membered heterocyclic structure and
$R_5$ denotes $C_1$- to $C_3$-alkyl, phenyl, tolyl or chlorophenyl or conjointly wth $R_3$ forms a group of the formula $(CH_2)_q$,
wherein
$q$ represents 3 to 5 and
wherein, in the case that $n = 2$
the radicals Z are identical or different or, if they are in the ortho-position to one another, conjointly form a grouping of the formula $—CO—NR_3—NR_3—CO—$, $—NR_3—CO—CO—NR_3—$, $—CO—NR_3—CO—$, $—NR_3—CO—NR_3—$, $—NR_3—SO_2—NR_3—$, $—NR_3—CS—NR_3—$ or $—CO—NR_3—SO_2—$,
B represents a $C_1$- to $C_4$-alkylene bridge which is optionally interrupted by hetero-atoms, such as oxygen or sulphur,
$R_1$ represents hydrogen, a lower alkyl radical or the grouping $-B-NH-SO_2R$,
X represents CN or the $COOR_2$ group,
wherein
$R_2$ denotes a $C_1$- to $C_3$-alkyl or $C_7$- to $C_9$-phenalkyl radical which is optionally substituted by OH, $OCOCH_3$, $OCH_3$ or CN,
the ring *a* represents a 1,4-phenylene ring which is optionally substituted by 1 or 2 methyl, ethyl, methoxy, trifluoromethyl or acetamino groups or chlorine or bromine atoms and
the ring *b* can also be benz-fused and/or can contain additional non-polar substituents such as, for example, methyl, ethyl, chlorine, trifluoromethyl, nitrile and methoxy.

3. Process according to claim 1, characterised in that the styryl dyestuffs used are those of the formula

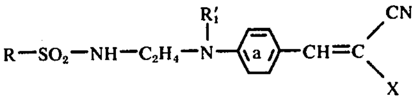

wherein
R, X and the ring a have the meanings mentioned in claim 1 and
$R_1'$ denotes methyl, ethyl, cyanoethyl, carbamoylethyl, hydroxyethyl and chloroethyl.

4. Process according to claim 1, characterised in that styryl dyestuffs of the formula

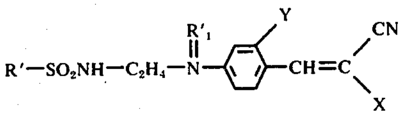

are used,
wherein
$R_1'$ and X have the meanings mentioned in claims 1 and 3 and
R' denotes methyl, ethyl, benzyl, phenyl,

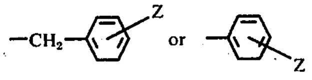

Z has the meaning indicated in claim 2 and
Y represents hydrogen or methyl.

* * * * *